Figure 1:
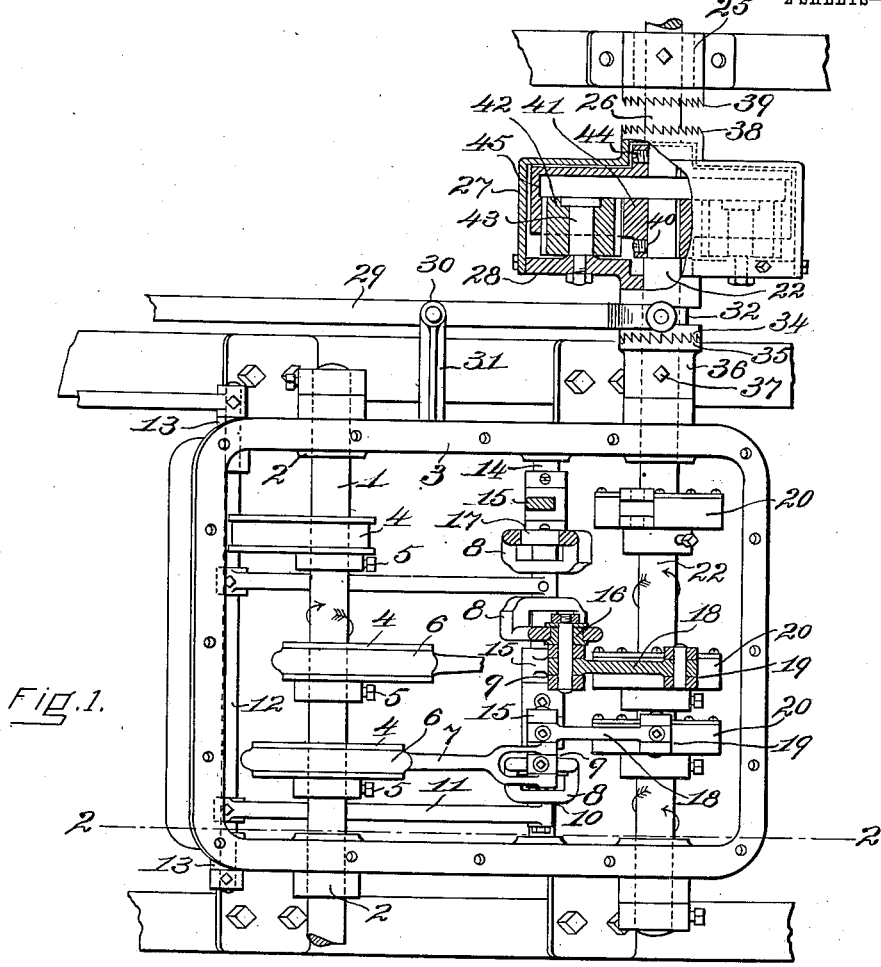

A. B. FOWLER.
DRIVING MECHANISM FOR MOTOR VEHICLES.
APPLICATION FILED FEB. 23, 1901.

969,140.

Patented Aug. 30, 1910.

2 SHEETS—SHEET 1.

WITNESSES
Edward S. Day
Horace Van Emmen

INVENTOR
Alfred B. Fowler
by his Attorney
Benjamin Phillips

A. B. FOWLER.
DRIVING MECHANISM FOR MOTOR VEHICLES.
APPLICATION FILED FEB. 23, 1901.

969,140.

Patented Aug. 30, 1910.
2 SHEETS—SHEET 2.

WITNESSES
Edward S. Day
Horace Van Evern

INVENTOR
Alfred B. Fowler
by his Attorney
Benjamin Phillips

UNITED STATES PATENT OFFICE.

ALFRED B. FOWLER, OF CENTRAL FALLS, RHODE ISLAND, ASSIGNOR OF ONE-HALF TO BENJAMIN PHILLIPS, OF BOSTON, MASSACHUSETTS.

DRIVING MECHANISM FOR MOTOR-VEHICLES.

969,140.  Specification of Letters Patent.  Patented Aug. 30, 1910.

Application filed February 23, 1901. Serial No. 48,497.

*To all whom it may concern:*

Be it known that I, ALFRED B. FOWLER, a citizen of the United States, residing at Central Falls, in the county of Providence and State of Rhode Island, have invented certain new and useful Improvements in Driving Mechanism for Motor-Vehicles; and I do hereby declare the following to be a full, clear, and exact description of the invention, such as will enable others skilled in the art to which it appertains to make and use the same.

The present invention relates to driving mechanism for motor vehicles.

The object of the present invention is to provide a variable speed power transmitting device for motor vehicles constructed and arranged to transmit power from a continuously rotated driving shaft to a driven shaft, whereby said driven shaft may be rotated continuously and the speed thereof varied uniformly from zero to the predetermined maximum.

A further object of the present invention is to provide a power transmitting device whereby the prime mover of the driving shaft may be run continuously at its most efficient speed and the full power developed applied to the driven axle.

To the above end the present invention consists in the variable speed power transmitting device hereinafter described and claimed.

Motor vehicles, as at present constructed, are necessarily provided with means whereby the speed of the vehicle may be varied. These means comprise various combinations of belts, cog-wheels, clutches, and frictional devices, all of which, however, are objectionable for various reasons. Moreover, with these devices it has been the general practice to provide for two or three speeds, say 5, 10, and 20 miles per hour, and to obtain the intermediate speeds by varying the speed of the motor. Since nearly, if not quite, every form of motor has a maximum efficiency at only one speed, a variation from such a speed results in decreased efficiency of the motor. This is true of both steam and electric motors, although neither shows a decrease in efficiency to so great an extent as does the hydro-carbon motor.

I am aware that it has heretofore been proposed to operate a motor in a motor vehicle at its most efficient speed and by means of a variable throw reciprocating power transmitting device vary the speed of the vehicle, but these devices were objectionable on account of the failure of the same to act continuously and uniformly and the relatively large amplitude of vibration necessary to produce the desired speed. These vibrations resulted in a series of disconnected, intermittent impulses on the driving shaft, imparting a jerky and disagreeable motion to the vehicle. In the present invention I have overcome these highly objectionable features by so combining a series of vibratory elements that the action of one element overlaps that of another so that practically continuous action is obtained. Moreover, by reducing the amplitude of the vibrations and increasing the number to each revolution of the driven shaft, practically uniform motion is produced.

Figure 2:
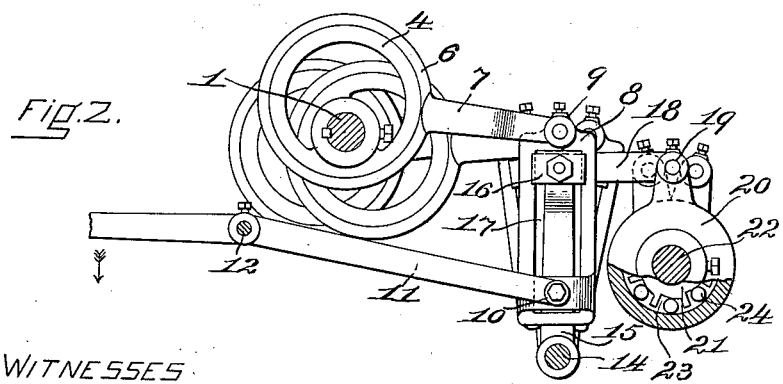
Figure 3:
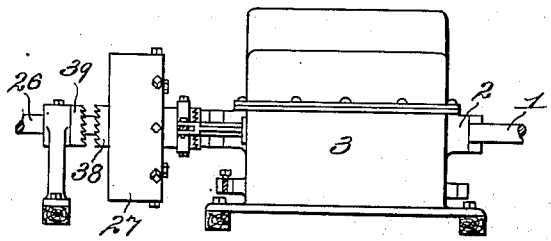
Figure 4:
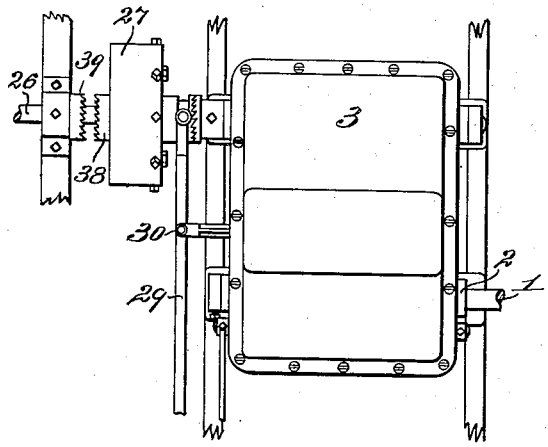
Figure 5:
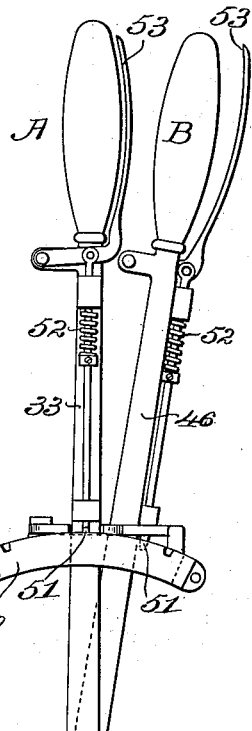
Figure 6:
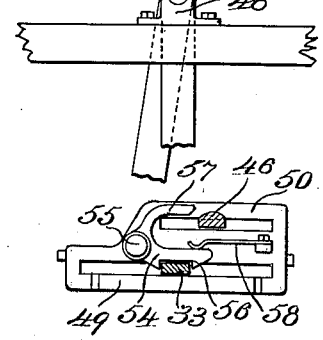

In the accompanying drawings,—Figure 1 is a top plan view of my improved variable speed power transmitting device partly in section, Fig. 2 is a side elevation of the same also partly in section, Fig. 3 is an end elevation looking toward the right Fig. 1, Fig. 4 is a top plan view showing the casing for the power transmitting device, Fig. 5 shows the reversing and speed controlling levers, and Fig. 6 shows partly in section the locking device for the reversing lever.

In the illustrated embodiment of my invention 1 represents the driving shaft which preferably is integral with the motor shaft. This shaft is mounted in suitable bearings 2 secured to the sides of the casing 3. Mounted upon the shaft 1 are the eccentrics 4 held to rotate therewith by the set screws 5. The eccentric straps 6 integral with the arms 7 transmit oscillatory movements to slotted links 8, being pivotally connected thereto at 9. The slotted links 8 are pivotally supported at 10 by the levers 11 fixedly secured to the shaft 12 which is mounted in bearings 13 and is arranged to be oscillated by the speed changing lever 46 (see Fig. 5) to raise or lower said links for a purpose hereinafter to be described. Slidingly mounted in the links 8 are the blocks 16 arranged to be oscillated thereby but held from longitudinal movement therewith by the links 15 pivotally connected to said blocks and mounted to oscillate upon the shaft 14 fixedly secured in the frame 3. If the slotted links 8 be raised by means of the hand lever 46, the axis of oscillation of said links will be brought nearer the blocks 16 and the extent of oscillation of said blocks will be correspondingly diminished until, when the axes of the links and blocks coincide, it becomes zero. Pivotally connected to the blocks 16 are the links 18, the other ends of which are pivotally connected, as at 19, to the clutch members 20. The other clutch members 21 keyed to the shaft 22, are provided with recesses 23 having inclined bottoms, rolls 24 being located within these recesses and arranged to run upon the inclined bottoms to connect the members of the clutch. When the parts are in the position shown in Fig. 2, the maximum throw is given to the clutch members 20 by the blocks 16 so that the vehicle will be running at its maximum rate of speed. As the links are raised and the extent of oscillation of the blocks 16 diminished, the throw of the clutch members 20 becomes less and the speed of the shaft 22 is correspondingly reduced. When the axis of oscillation of the slotted links 8 coincides with the axis of blocks 16, no movement will be imparted to clutch members 20 and the vehicle will remain stationary although the motor and driving shaft are running at their regular and constant speed.

In the drawings I have shown three eccentrics set at an angle of 120° with each other and three sets of links, connecting levers, and clutches, but my invention is not limited to this particular number of elements but contemplates broadly the use of a plurality of elements, so constructed and arranged that the action of said elements shall overlap to produce practically continuous rotation of the shaft 22. Moreover, as will be apparent from an inspection of Fig. 2, the maximum amplitude of oscillation of the clutch members 20 is comparatively small, being through an arc of approximately 30°. Each stroke of each clutch will therefore cause about one fifteenth (1/15) of a revolution of shaft 22, allowance being made for overlap, so that the rotation of this shaft 22 will be practically uniform and steady, even at the maximum speed. I do not limit myself, however, to the above-stated figures, as these may be varied considerably in practice without departing from the spirit of my invention, and where I use the phrase "oscillations of a small amplitude" in the claims, I mean oscillations imparting so small a fractional part of one complete revolution to the driven shaft that the rotation of said shaft shall be practically uniform.

It will be noted that the shape of the bottoms of the recesses 23 is such that the clutch member 20 will be connected with the clutch member 21 when the clutch member 20 is moving toward the left, Fig. 2. In other words the strain on the links 7 and 18 is one of tension and not of compression, hence these parts may be made extremely light weight. I have also provided in my power transmitting device suitable reversing mechanism whereby the direction of motion of the vehicle may be reversed without, however, reversing the direction of rotation of the shaft 22.

My improved reversing device comprises a frame or casing 27 which is cup-shaped, the end thereof being closed by a circular plate 28 secured to said casing. Mounted in suitable bearings, such as 25, and in alinement with said driven shaft 22 is the main vehicle-driving shaft 26, which may be connected with the driving axle of the vehicle in any desired manner. Bearings in the casing 27 and the plate 28 support the reversing device upon the adjacent ends of the shafts 22 and 26 and permit relative rotative movement of the two shafts and of the casing. This casing is also arranged to have longitudinal movement along the shafts and means are provided whereby the operator may cause such longitudinal movement and for the purpose about to be described. The lever 29, pivotally supported at 30 by the bracket 31 projected from the frame 3 of the power transmitting device is bifurcated at one end and carries on each arm a roll arranged to engage at diametrically opposite points the groove 32 in the hub of the plate 28, while the other end of said lever 29 is connected by suitable levers (not shown) to the reversing lever 33 provided with the handle A, the arrangement being such that movement of the lever 33 will impart corresponding movement to the lever 29 and move the frame 27 of the reversing device longitudinally on the ends of the shafts.

Clutch teeth 34 formed upon the hub of the plate 28 are arranged to engage correspondingly-shaped teeth 35 on the collar 36 fixed securely to the shaft 22 by the set-screw 37. On the hub of the frame 27 at the other end of the reversing device are formed the clutch teeth 38 which are arranged to engage the correspondingly-shaped fixed clutch teeth 39 on the bearing 25. The teeth on the different parts are so formed that when the frame or casing 27 is moved longitudinally to the right, as shown in Fig. 1, clutch teeth 34 and 35 will be in engagement and the frame 27 will be rotated by and with shaft 22. When, however, the frame is moved to the left, clutch teeth 38 and 39 will be in engagement and the casing will be held from rotation with shaft 22.

Fixedly secured to the end of shaft 22 by means of set screws 40 is the gear 41 which meshes with a set of intermediate gears 42 rotatably supported upon the studs 43 mounted on the plate 28. In the drawings I have indicated two of these intermediate gears, but a lesser or a greater number may be employed without affecting in any degree the mode of operation of my device. Fixedly secured to the end of the shaft 26 by the set screw 44 is the internal gear 45 with which the intermediate gears 42 mesh.

It will be evident to those skilled in the art that when the parts are in the position shown in Fig. 1, the intermediate gears 42 are held from rotation on their studs 43 by the gear 41, the studs and the gear 41 both rotating with the shaft 22. Hence the internal gear 45 will be rotated in the same direction, being practically locked to gear 41 by the intermediate gears 42 which, as above stated, are held from rotation on their supports. When, however, the frame or casing 27 is moved to the left to carry clutch teeth 38 into engagement with clutch teeth 39 and to disengage clutch teeth 34 and 35, the frame 27 and therefore the studs 43 will be held from rotation with shaft 22, causing the intermediate gears 42 to be rotated upon their supports by the gear 41. These gears 42 in turn drive the internal gear 45 and the shaft 26 upon which said gear is fixedly mounted in the opposite direction to that of gear 41 and shaft 22 and at a reduced speed, thus reversing the direction of motion of the vehicle. In this connection it will be noted that there is relative movement of the gears only when the vehicle is running backward, there being no relative movement of any of the parts of my device when the vehicle is moving forward, which of course is its normal direction, so that the wear of the various parts becomes insignificant. Moreover, as a high rate of speed for backward running is never desired, the increased force gained by the difference in diameters of gears 41 and 45 will fully compensate for the increased friction due to the gearing. Furthermore, it will be evident that should the vehicle be left standing on an incline with the reversing lever in its forward position, and the speed changing lever at o, whether the engine be running or not the vehicle will be held from backward movement down the incline (or forward movement if the vehicle be headed down the incline with the reversing lever in its backward position), the lever 11 taking up the thrust of the links 18 which force, being applied at the fulcrum, can have no tendency to oscillate the slotted links 8. Thus a simple and efficient brake is provided which will prevent the vehicle's "running away" when left on an incline and which is released by the very act of applying power to move the vehicle up the incline. In motor vehicles as usually constructed, a foot or hand brake is used which must be released at the very instant the power is applied to start the vehicle up the incline, or otherwise the vehicle will begin to run backward down the incline and the application of power then will throw a dangerous strain or shock upon the machinery. If the power be applied before the brake is released, the hydrocarbon motor may be stalled or the brake injured. It will be seen that none of these results are possible in my device, as the releasing of the brake and application of the power are necessarily one and the same operation.

The reversing and speed controlling levers 33 and 46 respectively are pivotally mounted upon a short shaft 47 supported in the bracket 48 secured to the vehicle body at some convenient place. I have provided locking devices for these levers which consist of the notched segments 49 and 50 integrally formed as shown in Fig. 6. Pawls 51 are arranged to engage the notches in these segments and lock the levers in their adjusted position. Springs 52 act normally to hold the pawls in a notch from which they may be withdrawn by releasing levers 53. I have also provided simple means for locking the reversing lever in its neutral position until the speed changing lever has been brought to the zero position. Thus it will be impossible to reverse the vehicle without first turning off the power. Moreover, I propose to connect the reversing lever with some suitable automatic braking device so that a brake will be applied as soon as the reversing lever is brought to its neutral position. The device for locking the reversing lever comprises a spring pressed latch 54 pivotally mounted at 55 and provided with the notch 56. The arm 57 is arranged to be engaged and lifted by the speed changing lever 46 against the tension of the spring 58 to unlock the reversing lever 33. Although I have shown but five notches on the speed changing lever segment, representing five different speeds, it will be evident that these notches may be almost indefinitely multiplied and the number of speeds correspondingly increased. It will be noted, moreover, that the change from one speed to another is gradual and smooth with no shock or strain on the parts.

In the operation of my improved variable speed power transmitting device the shaft 1 is driven at a constant speed by a motor provided with suitable governing devices so that its speed may be constant and the engine most efficient. The eccentrics 4 are rotated with the shaft, imparting oscillatory movements to the slotted links 8. These links in turn oscillate the clutch members 20, the amount of oscillation of these members and the consequent speed of the shaft 22 varying as the support 10 for the links 8 is moved nearer to and farther from the block 16. The direction of motion of the vehicle may be reversed by moving the reversing lever 33 and thereby shifting the reversing device from left to right or vice-versa in the manner above described.

Having thus described my invention I claim as new and desire to secure by Letters Patent of the United States:

1. A variable-speed power transmitting device for motor vehicles, having, in combination, a driving shaft, a driven shaft, reversing and speed changing mechanism for said driven shaft, means under control of the operator for varying progressively from zero to the maximum the speed of the driven shaft in either direction, separate means for controlling the reversal of the driven shaft, and means for preventing the reversal of the driven shaft except when the speed controlling means is in zero position, substantially as described.

2. A variable speed power transmitting device for motor vehicles, having, in combination, a driving shaft, an intermediate shaft, a driven shaft, means under the control of the operator for varying progressively from zero to the maximum the speed of the intermediate shaft, and a reversing device located between the intermediate shaft and the driven shaft, substantially as described.

3. A variable-speed power transmitting device for motor vehicles, having, in combination, a driving shaft, means for rotating said shaft, a driven shaft, connections between the shafts for driving the driven shaft in either direction, an actuator for said connections, means for interrupting the rotation of the driving shaft, and provisions for locking said actuator against movement until rotation of the driving shaft is interrupted, substantially as described.

4. A variable-speed power transmitting device for motor vehicles, having, in combination, a driving shaft, actuating means therefor, a driven shaft, connections between the shafts for driving the driven shaft in either direction, a controlling lever for said connections, means for varying the speed of the driving shaft, a lever controlling said means, and means for preventing movement of the first named lever from its neutral position at all times except when the speed varying lever is at zero position, substantially as described.

5. A variable-speed power transmitting device for motor vehicles, having, in combination, a driving shaft and means for actuating the same, means under control of the operator for varying the speed of said shaft, a driven shaft, a reversing device for the same under the control of the operator, and means for preventing the reversal of the driven shaft while power is applied to the driving shaft, substantially as described.

6. A variable-speed power transmitting device for motor vehicles, having, in combination, a shaft and means for actuating it, including speed varying and reversing mechanism, levers controlling the speed-changing and reversing mechanism, a pivoted latch provided with a notch arranged to engage the reversing lever when in its neutral position and to lock the same to prevent movement in either direction, and means for releasing the reversing lever when the speed-varying lever is moved to zero position, substantially as described.

7. A variable-speed power transmitting device for motor vehicles, having, in combination, a driving shaft, means for varying the speed thereof, a driven shaft, and a reversing device connecting the said shafts and comprising a frame, intermediate pinions rotatably carried thereby, a pinion fixed to the driving shaft and meshing with the intermediate gears, an internal gear fixed to the driven shaft and meshing with the intermediate pinions, means for rotatively connecting the frame with the driving shaft to cause the driven shaft to rotate in one direction, means for preventing rotation of the frame, to cause the driven shaft to rotate in the opposite direction, and means under the control of the operator for throwing said means alternatively into operation, substantially as described.

8. A variable-speed power transmitting device for motor vehicles, having, in combination, a shaft and means for actuating it, including speed varying and reversing mechanism, levers controlling the speed changing and reversing mechanism, a pivoted latch arranged to engage the reversing lever when in its neutral position and to lock the same from movement in either direction and arranged to be engaged by the speed-varying lever when the latter is in zero position, and thereby to be held out of engagement with the reversing lever so as to unlock the same, substantially as described.

9. A variable-speed power transmitting device for motor vehicles, having, in combination, a driving shaft, a driven shaft, connections between the shafts for driving the driven shaft comprising a reversing gear, means controlled by the operator for varying progressively the speed of the driven shaft from zero to a maximum, means controlled by the operator for operating the reversing gear, and automatic means for preventing reversal by such means when the speed-changing means are not at zero position, substantially as described.

In testimony whereof I affix my signature, in presence of two witnesses.

ALFRED B. FOWLER.

Witnesses:
HENRY B. METCALF,
EDW. B. THORNTON.